United States Patent Office 3,262,553
Patented July 26, 1966

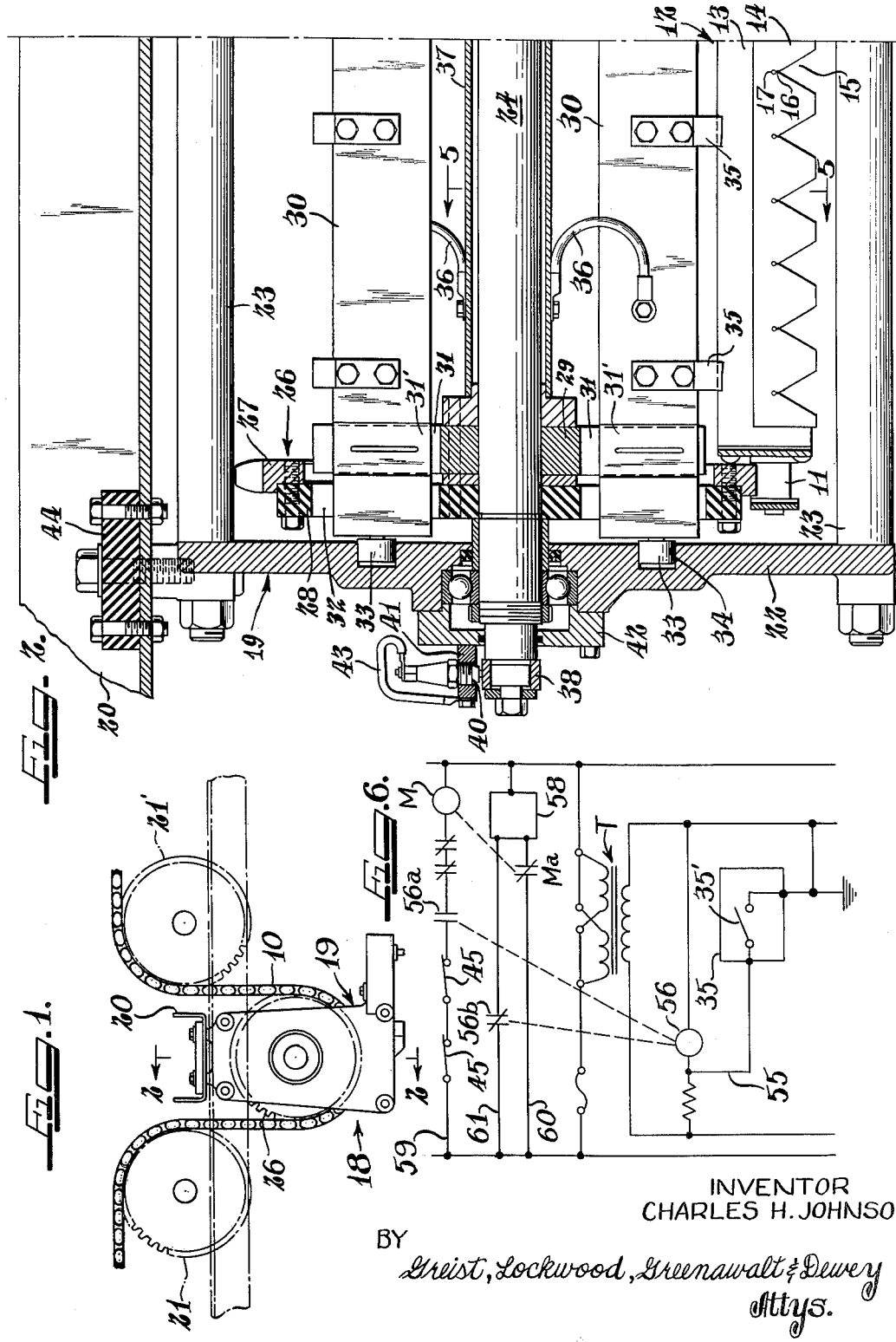

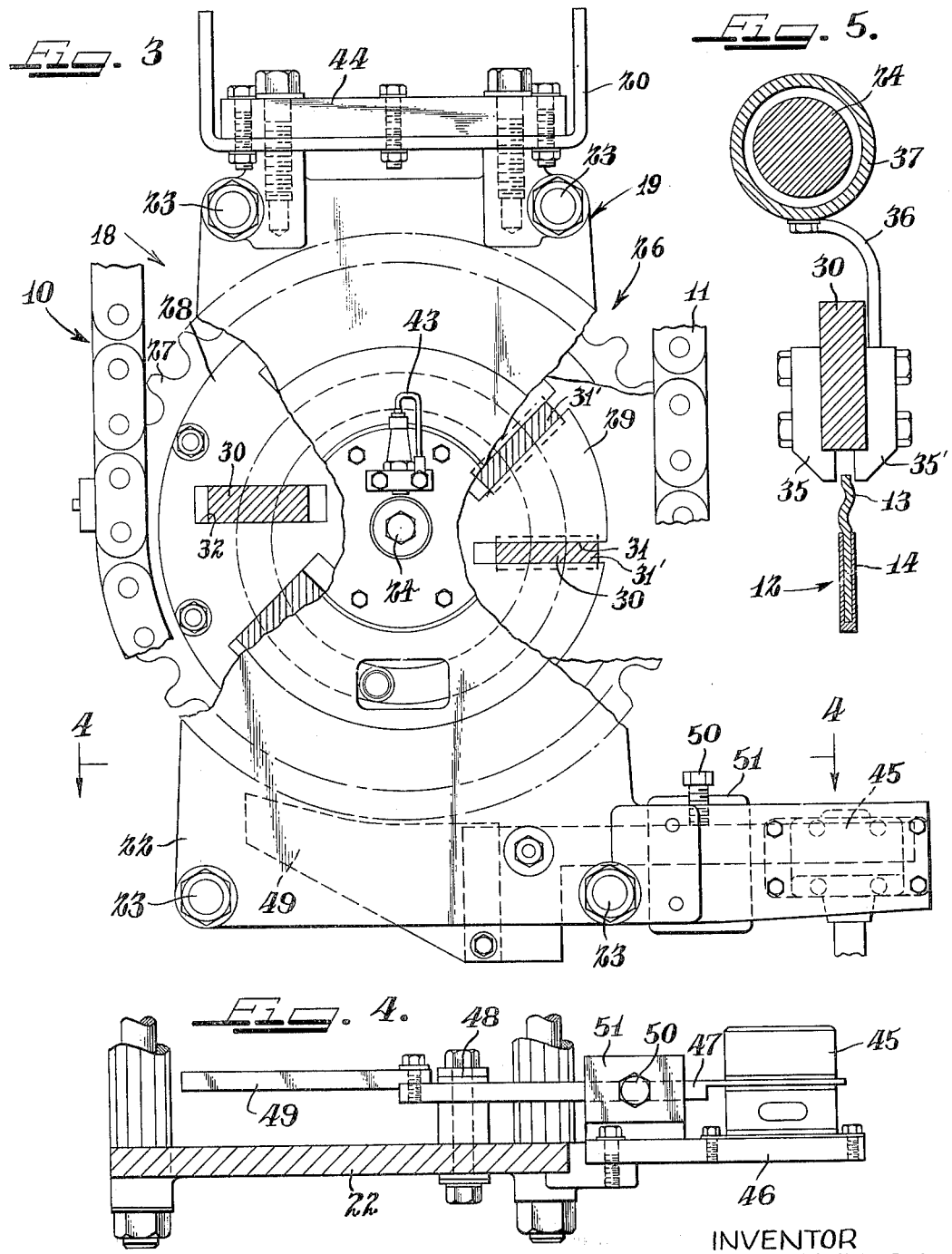

3,262,553
SAFETY APPARATUS FOR A CONVEYOR
Charles H. Johnson, Madison, Wis., assignor to Oscar Mayer & Co., Inc., Chicago, Ill., a corporation of Illinois
Filed Oct. 23, 1964, Ser. No. 405,943
10 Claims. (Cl. 198—232)

This invention relates to safety devices for machinery and is more particularly concerned with improvements in apparatus for sensing the condition of cross bar members on a continuously traveling endless conveyor and for actuating a signal and/or stopping the movement of the conveyor when a cross bar member is bent or damaged so as to require repair or replacement in order to prevent jamming or damage to other equipment with which the conveyor is employed.

Equipment has recently been developed which forms and processes meat products of the small sausage type, for example, sausages and wieners, wherein a batter is stuffed into an artificial casing and the stuffed casing is divided into links by casing constricting devices carried on cross bar assemblies which are longitudinally spaced on a continuously traveling endless conveyor on which the encased links are carried through processing chambers after which they are freed from the cross bar assemblies, the casing is stripped from the links and the latter are packaged for marketing or collected for storage. The link forming cross bar assemblies include longitudinally spaced cross bar members of plate-like form which extend between laterally spaced traveling side chains constituting the endless conveyor structure. In the use of such equipment, it has been found desirable to provide a safety device to insure that there will not be any malfunctioning of the equipment due to bent cross bar members which may occasionally develop, and it is a general object of the invention, therefore, to provide a safety device for use with a conveyor of the character described which will check each cross bar member or other portion of the linking bar assemblies at a predetermined point in the path of travel of the conveyor and when a bar is found which is bent beyond certain limits a signal will be actuated and/or the conveyor will be stopped to permit removal and replacement of the bent or defective cross bar member.

It is a more specific object of the invention to provide a device for checking the condition of cross bar members on a continuously traveling conveyor which conveyor is characterized by laterally spaced chains having plate-like cross bars extending in transverse planes and equally spaced in the lengthwise direction on the chains, the chains being carried on a pair of sprockets mounted in axially spaced relation on a supporting shaft and traveling about a portion of the periphery of the sprockets, the checking device comprising a pair of contact members mounted in spaced relation on an insulating bar which extends transversely of the path of the conveyor chains and which is supported for radial movement relative to the axis of rotation of the supporting cross shaft and which rotates with the cross shaft, the contact members being spaced apart a predetermined distance which is slightly greater than the effective thickness of the conveyor cross bar members so that in the normal condition of the cross bar members the plates are adapted to straddle the inner edges of the cross bar members without contacting the same while the cross bar member which is bent out of normal position will engage at least one of the contact members and through an electrical circuit actuate a signal and/or interrupt the drive for the conveyor so as to prevent jamming or other malfunctioning of the machine.

Another object of the invention is to provide a device for controlling the movement of a continuously traveling conveyor in accordance with the condition of plate-like cross bar members which connect laterally spaced chains on the conveyor so as to provide for stopping the conveyor and/or actuating a signal when a cross bar member is found to be bent out of proper position, which device comprises reciprocating feelers mounted at a predetermined point in the path of movement of the conveyor so as to serve as switch contacts which close when they engage a bent bar and also a limit switch which is actuated when the feelers hit the bent bar and move the supporting chains out of their normal path.

These and other objects and advantages of the invention will be apparent from a consideration of the apparatus which is shown by way of illustration in the accompanying drawings wherein:

FIGURE 1 is a schematic view in side elevation illustrating a continuously traveling bar carrying conveyor in a sausage or wiener producing machine which has associated therewith a bar checking device embodying the principles of the present invention;

FIGURE 2 is a partial section taken on the line 2—2 of FIGURE 1, to an enlarged scale;

FIGURE 3 is an elevation showing one end of the checking device with portions broken away;

FIGURE 4 is a section at one end of the apparatus taken on the line 4—4 of FIGURE 3;

FIGURE 5 is a fragmentary section taken on the line 5—5 of FIGURE 2; and

FIGURE 6 is a schematic wiring diagram.

The apparatus is illustrated as associated with an endless traveling conveyor incorporated in a machine for continuously manufacturing sausages by stuffing long lengths of sausage casing with a batter, constricting the stuffed casing at intervals to divide the same into links and while the casing is held on an endless traveling conveyor by means of spaced cross bar assemblies having slots in which the casing is constricted, carrying the links through processing chambers, after which the processed links are removed from the conveyor, the casing is stripped therefrom and the links are packaged or collected for storage and subsequent marketing. A sausage forming and processing machine of this type is disclosed in Millenaar Patent No. 3,059,272, granted October 23, 1962, to which reference may be had for details of several different cross bar assemblies each including a plate-like cross bar extending transversely of the conveyor between parallel side chains.

As illustrated in FIGURES 2, 3 and 5, a conveyor structure with which the present apparatus may be employed, comprises a pair of laterally spaced chains 11 between which extend longitudinally spaced, link forming cross bar assemblies 12, each of which includes a plate-like cross bar member 13 connected at its opposite ends by suitable brackets to the side chains 11. Only the left half of the view is shown in FIGURE 2, it being understood that the structure is generally symmetrical about a vertical center line. The cross bar member 13 has its outer margin encased in a sheathing 14 of rubber or similar material with outwardly opening, V-shaped casing constricting slots 15 into which the stuffed sausage casing is forced to constrict the same with the converging side edges of each slot 15 terminating at a small slit 16 forming a passageway to a small diameter pocket 17 in which the constricted casing is retained while it travels through the processing apparatus. The assembly 12 as shown is provided with a plurality of the V-shaped slots 15 spaced equidistant along the bar member 13 for accommodating a plurality of lengths of stuffed casing arranged thereon in parallel relation. The base plate or bar member 13 may have lengthwise extending rib formations, as shown in FIGURE 5, to increase its strength.

The bar checking apparatus 18, as shown in FIGURE 1, is mounted on a frame structure 19 which is suspended from a cross channel member 20 between spaced sprocket assemblies 21 and 21' over which the conveyor 10 travels. The apparatus 18 is located at a point in the path of travel of the conveyor 10 where the continued advance of a bent cross bar would be most likely to result in damage to the equipment.

The apparatus 18 comprises the frame structure 19 formed by parallel side plates 22 which are connected by cross rods 23 and suspended from the supporting cross channel member 20. A cross shaft 24 is journaled at its ends in the side plates 22 and carries a pair of sprocket assemblies 26 axially spaced thereon with the spacing corresponding to the spacing of the side chains 11 of the conveyor structure 10 and arranged to support the conveyor 10 as shown in FIGURES 1 and 3 so that the chains 11 traverse a path extending about a substantial portion of the periphery of the sprocket assemblies 26. Each of the sprocket assemblies 26 comprises a sprocket ring 27 and a mounting disc or plate 28 secured on the shaft 24. The discs 28 are of insulating material so as to insulate the conveyor 10 electrically from the shaft 24.

The shaft 24 also carries a pair of supporting plates or discs 29 which are mounted inside the sprocket assemblies 26 and which support a plurality of plate-like bar members 30. The supporting discs 29 have aligned slots 31 for receiving the plate-like bar members 30, each slot 31 having a width less than the normal thickness of the bar and accommodating in sliding relation therein a portion of the bar of reduced thickness as indicated at 31' and each slot acting as a guideway for movement of the plate or bar member 30. The slots 31, of which there are eight in the form of the apparatus shown, are each in a plane which is offset somewhat relative to the axis of the shaft 24 and provide guideways for movement therein of the bar members 30 in a plane which is generally radial with respect to the axis of the shaft 24. The mounting plates or discs 28 for the sprocket rings are each slotted at 32 with the slots 32 being aligned with the guide slots 31 in the discs 29 and being of a size sufficient to accommodate movement of the ends of the slide bars 30. The slide bars 30 are extended at their ends beyond the supporting plates 29 and the discs 28 of the sprocket assemblies 26 and carry cam rollers 33 which engage in track forming cam slots 34 in the end plates 22, the track slots 34 being such that the plates 30 are given a movement in a generally radial direction outwardly of the shaft 24 as they traverse the bottom of the path of the sprocket assemblies 26. The slide plates 30 carry pairs of contact members or fingers 35, 35' (FIGURES 2 and 5) which are spaced along their length with the contact fingers of each pair thereof extending beyond the outer margin of the supporting slide plate 30 and separated a predetermined distance which is slightly greater than the effective thickness of the inner marginal portion of the plate 13 on the cross bar assembly 12. The plates 30 are each connected by an electrical cable, indicated at 36, to a sleeve 37 on the shaft 24. The shaft 24 carries at its opposite ends slip rings 38 which are engaged by brushes 40 mounted on brackets 41 at the ends of the bearing housing 42 which brushes 40 have a cable connection 43 with the support plate 22. The suspension structure for the frame 19 comprises insulator bars 44 which insulate the frame 19 electrically from the supporting frame channel member 20.

A normally closed limit switch 45 is mounted on a bracket 46 at the lower end of each vertical frame plate 22 which is actuated by a pivoted arm 47. The arm 47 is pivotally mounted at 48 and has a curved end extension 49 disposed beneath the sprocket assembly 26 so as to be spaced slightly below the chain 11 when it is in its normal path. A set screw 50 holds a counterweight block 51 on the arm 47 which biases the arm 47 and its extension 49 so as to hold it in proper position relative to the path of the chain 11. The arm 47 is swung on the pivot 48 to actuate the switch 45 when the position sensing fingers 35 and 35' engage the innermost edge of a bent bar 13 so as to force the chain 11 off the sprocket assembly 26 and depress the end 49 of the switch actuating arm 47 thereby tripping the limit switch 45 and actuating a warning lamp or other signal as well as stopping the conveyor drive.

The contact fingers 35, 35', upon contact with a bent bar, act as a switch in a low voltage control circuit as indicated schematically in the diagram of FIGURE 6. The low voltage circuit controls a motor starter M in a circuit from which current is supplied through transformer T to the low voltage circuit. The fingers 35, 35' are connected into a by-pass line 55 provided in the low voltage circuit for by-passing a relay 56 which is normally energized, closing contact 56a, so that under normal conditions current flows in the motor starter circuit and the motor operates continuously. When a bent bar is engaged by a contact finger 35 or 35', current in the low voltage circuit is shunted around the normally energized motor control relay 56 through the by-pass line 55 and the relay contact 56a is opened which cuts off the current to the conveyor drive motor and stops the movement of the conveyor 10. When the relay contact 56a is opened the relay contact 56b moves back to a normally closed position and signal light indicated at 58 or other warning device is actuated. When there is no bent bar present the switches 45, which are in the line indicated at 59 with the motor starter M, remain closed and also the relay contact 56a so that the drive motor continues to run. The motor starter contact Ma and the relay contact 56b in alarm lines 60 and 61 are opened to de-energize the alarm.

While the present apparatus is shown as especially useful in connection with a sausage making and processing conveyor, it will be understood that it is not limited to use with the illustrated conveyor structure but it may be employed with any similar conveyor in other arrangements. Also, where particular materials and specific details of construction are referred to, it is understood that the use of equivalent materials is contemplated and that structural details differing from those illustrated may be resorted to within the spirit of the invention.

I claim:

1. Apparatus for checking the condition of cross bar members carried on a traveling conveyor which conveyor is characterized by laterally spaced chains having cross bar members of plate-like form extending in transverse planes and equally spaced in the lengthwise direction on the chains, said checking apparatus comprising a pair of sprockets mounted in axially spaced relation on a supporting shaft and positioned in the path of the conveyor so that the chains engage the sprockets and travel therewith along a portion of the peripheral path of the sprockets, contact members mounted in spaced relation on an insulated bar which is supported for movement in a generally radial direction relative to the axis of rotation on said supporting shaft, said contact members being spaced apart a predetermined distance which is slightly greater than the effective thickness of the conveyor cross bar members and being mounted on said shaft for movement toward said path of said conveyor so that in the normal condition of the cross bar members the contact members are adapted to travel with said cross bar members and to straddle the inner edges of the cross bar members without contacting the same while a cross bar member which is bent out of normal position will be contacted by at least one of the contact members, means for moving said insulated bar toward and from the path of said cross bar members, and an electrical circuit means operated by engagement of said contact members with a cross bar member to interrupt the advance of said conveyor.

2. Apparatus for checking the condition of cross bar members carried on a traveling conveyor which conveyor is characterized by laterally spaced chains having cross bar members with plate-like portions extending in transverse planes and equally spaced in the lengthwise direction on the chains, said checking apparatus comprising a pair of sprockets mounted in spaced relation on a supporting cross shaft and positioned in the path of the conveyor so that the chains engage the sprockets and travel therewith along a portion of the peripheral path of the sprockets, a plurality of slider bar members mounted in circumferentially spaced relation on spaced plates on said cross shaft, said plates having slots forming guideways for said slider bar members which extend in a generally radial direction relative to the axis of rotation of said cross shaft and rotate with said cross shaft, said slider bar members having co-operating contact fingers spaced apart a predetermined distance which is slightly greater than the effective thickness of the plate-like portions of said conveyor cross bar members so that in the normal condition of the cross bar members the contact fingers are adapted to straddle the inner edges of the cross bar members when moved adjacent thereto without contacting the same while a cross bar member which is bent out of normal position will be contacted by at least one of the fingers, means for moving said slide bar members toward and from the path of said cross bar members in timed relation to the advance of said cross bar members, and an electrical circuit means responsive to engagement of said contact fingers with a cross bar member for controlling the advance of said conveyor.

3. Apparatus for sensing the condition of cross bar members carried on a traveling conveyor and for interrupting the movement of the conveyor when a cross bar is bent out of its normal position, said conveyor being characterized by laterally spaced chains having cross bar members extending in transverse planes and equally spaced in the lengthwise direction on the chains, said apparatus comprising a pair of sprockets mounted in axially spaced relation on a supporting shaft and positioned in the path of the conveyor so that the chains engage the sprockets and travel therewith along a portion of the peripheral path of the sprockets, contact members mounted in spaced relation on a slide bar which is supported for movement in a generally radial direction relative to the axis of rotation of said supporting shaft and for rotation with said shaft, said contact members being spaced apart a predetermined distance which is slightly greater than the effective thickness of the conveyor cross bar members so that in the normal condition of the cross bar members the contact members, when moved toward the cross bar members, are adapted to straddle the inner edges of the cross bar members without contacting the same while a cross bar member which is bent out of normal position will be contacted by at least one of the contact members, means for moving said slide bar toward and from the path of said cross bar members in timed relation to the advancing movement of said cross bar members, and an electrical circuit means responsive to engagement of said contact members with a cross bar member which is operative to stop the movement of said conveyor.

4. Apparatus for checking the condition of cross bar members carried on a traveling conveyor which conveyor is characterized by laterally spaced chains having plate-like connecting cross bar members extending in transverse planes and equally spaced in the lengthwise direction on the chains, said apparatus comprising a pair of sprockets mounted in axially spaced relation on a supporting shaft and positioned in the path of the conveyor so that the chains engage the sprockets and the cross members travel therewith along a portion of the peripheral path of the sprockets, a pair of laterally spaced support plates mounted on said supporting shaft, said support plates having guide slots spaced circumferentially and extending in a generally radial direction relative to the axis of said supporting shaft, slide bars mounted in said guide slots for movement in a generally radial direction relative to the axis of rotation of said supporting shaft and for rotation with said shaft in alignment with cross bar members on said conveyor, contact fingers mounted in spaced pairs along the outer margins of said slide bars and being spaced apart a predetermined distance which is slightly greater than the effective thickness of the cross bar members on the conveyor so that in the normal condition of the cross bar members the contact fingers, when moved toward said cross bar members, are adapted to straddle the inner edges of the cross bar members without contacting the same while a cross bar member which is bent out of normal position will be contacted by at least one of the fingers, means for moving said slide bars toward and from the path of said cross bar members, and an electrical means which is responsive to contact of said fingers with a cross bar member for interrupting the movement of said conveyor.

5. Apparatus for controlling the movement of a traveling conveyor in accordance with the condition of cross bar members carried on the conveyor, said conveyor being characterized by laterally spaced chains having plate-like connecting cross bar members extending in transverse planes and equally spaced in the lengthwise direction on the chains, said apparatus comprising a pair of sprocket mounted in axially spaced relation on a supporting shaft and positioned in the path of the conveyor so that the chains engage the sprockets and the cross bar members travel therewith along a portion of the peripheral path of the sprockets, a pair of spaced support plates mounted on said supporting shaft, said support plates having circumferentially spaced guide slots which extend in a generally radial direction relative to the axis of said supporting shaft, slide bars mounted in said guide slots of movement in a generally radial direction relative to the axis of rotation of said supporting shaft and for rotation with said shaft in alignment with cross bar members on said conveyor, contact fingers mounted in spaced pairs on the outer margins of said slide bars and being spaced apart a predetermined distance which is greater than the effective thickness of the cross bar members on the conveyor so that in the normal condition of the cross bar members the contact fingers, when moved toward said cross bar members, will straddle the inner margins of the cross bar members without contacting the same while a cross bar member which is bent out of normal position will be contacted by at least one of the fingers, means for moving said slide bars toward and from the path of said cross bar members so as to sense the condition of said cross bar members, an electrical means for driving said conveyor and electrical control means which is responsive to contact of said fingers with a cross bar member for disabling the conveyor drive means.

6. Apparatus as recited in claim 5, and said electrical means for disabling the conveyor drive means including a limit switch which is actuated by movement of a conveyor chain out of its normal path due to engagement of a cross bar member with a contact finger.

7. Apparatus for checking the condition of cross bar members carried on a traveling conveyor which is characterized by laterally spaced chains having plate-like cross bar members extending transversely and spaced in the lengthwise direction on the chains, said apparatus comprising a pair of sprockets mounted in axially spaced relation on a supporting shaft and positioned in the path of the conveyor so that the chains engage the sprockets and travel therewith along a portion of the peripheral path of the sprockets, a pair of laterally spaced support plates mounted on said supporting shaft, said support plates having guide slots spaced circumferentially and extending generally in a radial direction relative to the axis of said supporting shaft, slide bars mounted in said guide slots for movement in a generally radial direction relative to the axis of rotation of said supporting shaft and for rotation with said shaft in alignment with cross bar members along a portion of their path, contact fingers mounted along the outer margins of said slide bars and being spaced so that in the normal condition of the cross bar members the contact fingers, when moved toward said cross bar members, are adapted to move adjacent the sides of the cross bar members without contacting the same while a cross bar member which is bent out of normal position will be contacted by at least one of the fingers, means for moving said slide bars toward and from the path of said cross bar members, and an electrical means which is responsive to contact of said fingers with a cross bar member for interrupting the movement of said conveyor.

8. Apparatus for checking the condition of cross bar members carried on a traveling conveyor which is characterized by laterally spaced chains having cross bar members of generally plate-like form extending in transverse planes and spaced in the lengthwise direction on the chains, said apparatus comprising a pair of sprockets mounted in axially spaced relation on a supporting shaft and positioned in the path of the conveyor so that the chains engage the sprockets and travel therewith along a portion of the peripheral path of the sprockets, a pair of laterally spaced support plates mounted on said supporting shaft, said support plates having guide slots spaced circumferentially and extending generally in a radial direction relative to the axis of said supporting shaft, slide bars mounted in said guide slots for movement in a general radial direction relative to the axis of rotation of said supporting shaft and for rotation with said shaft in alignment with cross bar members on said conveyor, means along the outer margins of said slide bars which move closely adjacent to a side of each of the cross bar members on the conveyor without engaging the same, when the cross bar members are in normal condition and the slide bars are moved toward the same while a cross bar member which is bent out of normal position will be engaged and moved to displace the supporting chains outwardly of the sprockets, means for moving said slide bars toward and from the path of said cross bar members, and an electrical means including a limit switch for interrupting the movement of said conveyor which switch is operated upon outward displacement of a conveyor chain.

9. Apparatus for sensing the condition of cross bar members carried on a traveling conveyor and for interrupting the movement of the conveyor when a cross bar is bent out of its normal position, said conveyor being characterized by laterally spaced chains having cross bar members extending in transverse planes and equally spaced in the lengthwise direction on the chains, said apparatus comprising a pair of sprockets mounted in axially spaced relation on a supporting shaft and positioned in the path of the conveyor so that the chains engage the sprockets and travel therewith along a portion of the peripheral path of the sprockets, frame forming members mounted on said shaft, a slide bar on said frame forming members which is supported for movement in a generally radial direction relative to the axis of rotation of said supporting shaft, contact members on said slide bar which are spaced apart a predetermined distance so that in the normal condition of the cross bar members the contact members, when moved toward the cross bar members, are adapted to straddle in non-engaging relation the inner edges of the cross bar members while a cross bar member which is bent out of normal position will be engaged by at least one of the contact members, means for moving said slide bar radially toward and from the path of said cross bar members in timed relation to the advancing movement of said cross bar members, and an electrical circuit means responsive to engagement of said contact members with a cross bar member which is adapted to interrupt the movement of said conveyor.

10. Apparatus for checking the condition of cross bar members carried on a traveling conveyor which is characterized by laterally spaced chains having cross bar members extending in transverse planes and equally spaced in the lengthwise direction on the chains, said apparatus comprising a pair of sprockets mounted in axially spaced relation on a supporting shaft and positioned in the path of the conveyor so that the chains engage the sprockets and travel therewith along a portion of the peripheral path of the sprockets, a supporting frame mounted on said shaft between said sprockets, said supporting frame having guideways spaced circumferentially and extending generally in a radial direction relative to the axis of said shaft, slide bars mounted in said guideways for movement in a general radial direction relative to the axis of rotation of said shaft, contact fingers mounted in spaced pairs along the outer margins of said slide bars and spaced apart a predetermined distance which is slightly greater than the effective thickness of the cross bar members on the conveyor so that in the normal condition of the cross bar members the contact fingers, when moved toward said cross bar members, are adapted to straddle the inner edges of the cross bar members in non-contacting relation while a cross bar member which is bent out of normal position will be contacted by at least one of the fingers, means for moving said slide bars toward and from the path of said cross bar members, and an electrical means for interrupting the movement of said conveyor which is responsive to contact of said fingers with a cross bar member.

References Cited by the Examiner
FOREIGN PATENTS
447,508  5/1936  Great Britain.

EVON C. BLUNK, *Primary Examiner.*

E. SROKA, *Assistant Examiner.*